(12) United States Patent
Damidaux

(10) Patent No.: US 9,720,096 B2
(45) Date of Patent: Aug. 1, 2017

(54) METHOD FOR IMPROVING THE TRACKING OF A DATA TRANSMISSION SIGNAL OF A SATELLITE NAVIGATION SYSTEM

(75) Inventors: Jean-Louis Damidaux, Auzielle (FR); Régine Damidaux, legal representative, Auzielle (FR)

(73) Assignee: Thales, Courbevoie (FR)

( * ) Notice: Subject to any disclaimer, the term of this patent is extended or adjusted under 35 U.S.C. 154(b) by 1066 days.

(21) Appl. No.: 13/997,632

(22) PCT Filed: Dec. 6, 2011

(86) PCT No.: PCT/EP2011/071906
§ 371 (c)(1),
(2), (4) Date: Oct. 15, 2013

(87) PCT Pub. No.: WO2012/089452
PCT Pub. Date: Jul. 5, 2012

(65) Prior Publication Data
US 2015/0301186 A1 Oct. 22, 2015

(30) Foreign Application Priority Data

Dec. 30, 2010 (FR) .................................... 10 05179

(51) Int. Cl.
*G01S 19/24* (2010.01)
*G01S 19/25* (2010.01)
(Continued)

(52) U.S. Cl.
CPC .............. *G01S 19/24* (2013.01); *G01S 19/05* (2013.01); *G01S 19/07* (2013.01); *G01S 19/25* (2013.01)

(58) Field of Classification Search
USPC ............ 342/357.21, 357.22, 357.46, 357.63, 342/357.64; 701/468, 469
See application file for complete search history.

(56) References Cited

U.S. PATENT DOCUMENTS 5,691,974 A * 11/1997 Zehavi ................. H04B 1/7085
370/203
2005/0159891 A1 7/2005 Cohen et al.

OTHER PUBLICATIONS

Marco Anghileri et al: "Performance Evaluation of a Multi-frequency GPS/ Galileo/ SBAS Software Receiver", ION GNSS 20th International Technical Meeting of the Satellite Division, Sep. 28, 2007 (Sep. 28, 2007), pp. 2749-2761.
(Continued)

*Primary Examiner* — Dao Phan
(74) *Attorney, Agent, or Firm* — Baker Hostetler LLP

(57) ABSTRACT

A method for improving tracking of a data transmission signal emitted to a receiver of a satellite navigation system in addition to navigation signals emitted by satellites to a satellite positioning receiver, comprises: transmission to the receiver, during a improvement period, by an improvement signal emitted in coherence with the data transmission signal, of data Ni or other data Nai to predict the data, the data transmitted to the receiver by the data transmission signal during a transmission period starting after the improvement period, reception, by the receiver, of the data Ni or other data Nai which are transmitted by the improvement signal, generating symbols to modulate the data transmission signal during the transmission period by the data Ni received or other data Nai received, tracking the data transmission signal while removing the effect of modulation of the data transmission signal by the symbols generated.

9 Claims, 2 Drawing Sheets

(51) Int. Cl.
 *G01S 19/05* (2010.01)
 *G01S 19/07* (2010.01)

(56) References Cited

OTHER PUBLICATIONS

Yong Hyun Kim et al: "Design of GPS/SBAS software receiver", Control, Automation and Systems, 2007. ICCAS '07. International Conference on, IEEE, Piscataway, NJ, USA, Oct. 17, 2007 (Oct. 17, 2007), pp. 2550-2553.
"Egnos Fact Sheet 12: The Egnos Signal Explained" Internet Citation, 2005.

* cited by examiner

METHOD FOR IMPROVING THE TRACKING OF A DATA TRANSMISSION SIGNAL OF A SATELLITE NAVIGATION SYSTEM

CROSS-REFERENCE TO RELATED APPLICATIONS

This application is a National Stage of International patent application PCT/EP2011/071906, filed on Dec. 6, 2011, which claims priority to foreign French patent application No. FR 1005179, filed on Dec. 30, 2010, the disclosures of which are incorporated by reference in their entirety.

FIELD OF THE INVENTION

The field of the invention is that of satellite navigation systems commonly called GNSS, with reference to the expression "Global Navigation Satellite System."

BACKGROUND

In these systems, a satellite positioning receiver aboard a mobile object provides position information in respect of the mobile object, obtained by triangulation on the basis of the navigation signals emitted by the satellites visible from the mobile object.

The receiver also receives data transmission signals which transmit complementary data to the satellite positioning receiver, so as to improve the services rendered to the users, for example, by improving the precision or the integrity of the positioning of the mobile object.

Among the data transmission signals may be cited the augmentation signals, arising from a GNSS augmentation system of the GBAS ("Ground-Based Augmentation System") or SBAS ("Space-Based Augmentation System") type, based on one or more ground stations, able to identify the errors in the information provided by satellites and to dispatch, to the satellite positioning receiver, augmentation signals transporting data representative of individual corrections on the signals emitted by the satellites. Satellite navigation systems comprising augmentation systems make it possible to provide position information of better precision and which is less impaired than that arising from satellite navigation systems devoid of augmentation systems.

Current data transmission signals are dispatched with a predetermined bitrate and a predetermined coding of the Viterbi type, which limit their performance. Typically, for a signal transmitted over 1 second, 500 symbols are dispatched, coded over 2 ms. The data are dispatched on a data pathway (symbol-modulated carrier of the data to be transmitted by the signal) but without any pilot pathway (non-message carrier pathway, not modulated by symbols), thereby limiting the capabilities for tracking these signals at the level of the receiver. Indeed, tracking is carried out more easily on a pilot pathway than on a data pathway since the energy of a pilot pathway can be accumulated in a coherent manner whereas on a data pathway this accumulation must be done in an incoherent manner thereby introducing an additional noise level.

One seeks to improve the quality of the services rendered by current satellite navigation systems while retaining compatibility with current services and developments, that is to say while using current receivers and signals.

Currently, to improve the services rendered to users, an improvement signal is dispatched to the receiver. However, the improvement signal is added to the existing data transmission signal within the limit of powers permitted by the regulations. The permitted power must therefore be shared between the various signals.

Currently, the improvement signal comprises:
either a data pathway, thereby making it possible to dispatch additional data to the receiver so as to provide new services to the users, but not making it possible to improve the tracking of the current data transmission signal,
or a pilot pathway and a data pathway, thereby reducing the tracking and decoding performance for the new data pathway since the power permitted by regulation is shared between the pilot pathway and the data pathway.

SUMMARY OF THE INVENTION

The aim of the present invention is to propose a method for improving the tracking of the data transmission signal, which is for example an augmentation signal, of a satellite navigation system, which alleviates the aforementioned drawbacks.

For this purpose, the subject of the invention is a method for improving the tracking of a data transmission signal emitted to a receiver of a satellite navigation system in addition to navigation signals which are transmitted to it by the satellites, said method comprising:
 a step of transmission to the receiver, during a period called the improvement period and by means of an improvement signal emitted in coherence with said data transmission signal, of data or of other data making it possible to predict said data, said data furthermore being transmitted to the receiver by means of the data transmission signal during a transmission period starting after the end of the improvement period,
 a step of reception, by the receiver, of said data or of said other data which are transmitted by means of the improvement signal,
 a step of generating symbols serving to modulate the data transmission signal during the transmission period, by means of said data received or of said other data received,
 a step of tracking the data transmission signal while removing the effect of the modulation of said data transmission signal by the symbols generated.

Advantageously, the data transmission signal is an augmentation signal.

According to a first characteristic, the data transmission signal is transmitted with a first data coding of the Viterbi type.

Advantageously, the improvement signal is transmitted with a second coding such that the threshold of demodulation of the improvement signal by the receiver is lower than the threshold of demodulation of the data transmission signal by the receiver.

Advantageously, the improvement signal is transmitted with a second coding of the LDPC or Turbocode type.

Advantageously, the improvement signal is transmitted with interleaving.

Advantageously, the duration of the improvement period is shorter than the duration of the transmission period.

Advantageously, additional data are furthermore transmitted to the receiver by means of the improvement signal.

The proposed solution makes it possible to improve the tracking of data transmission signals such as, for example, augmentation signals, used in the satellite navigation systems in addition to the navigation signals emitted by the satellites, while preserving compatibility with existing systems since the existing data transmission signals are utilized. The proposed solution is usable with existing augmentation systems, for example, the SBAS systems, which are deployed in the WAAS, MTSAT and EGNOS systems.

The proposed solution does not make it necessary to add a pilot pathway since the data transmission signal which is at the origin a data pathway is no longer used as a data pathway but as a pilot pathway.

This makes it possible to allocate the whole of the permitted power on the second data pathway on which the improvement signal is transmitted and to obtain good performance in terms of quality of the reception of the data on the improvement signal (high power). The performance in terms of reception can be further increased by virtue of the use of performance codings (for example LDPC) and of interleaving schemes.

Moreover, given that the tracking is carried out on a pilot pathway, rather than on a data pathway, the signal's tracking threshold, that is to say the minimum power of the signal received by the receiver, is lowered so that tracking is possible.

Furthermore, with the proposed solution, it is not necessary to transmit at one and the same time a new pilot pathway and a new data pathway in order to improve tracking and provide new services (by transmitting additional data to the receiver). A single data pathway is necessary. The energy necessary for the emission of the signals for improvement and transmission of, for example, augmentation data is the energy necessary for the emission of 2 transmission pathways and not for 3 transmission pathways.

The method according to the invention is furthermore an autonomous method which is implemented solely on the basis of data, for example of augmentation data, which are, themselves, provided by the constructor of the data transmission system, for example, of the augmentation system. The data are therefore rapidly at the disposal of the emitter for dispatching the improvement signal to the receiver. This makes it possible to ensure the dispatching of the data on the improvement pathway with the speed suited to the rapid variation of the improvement data, as compared with the navigation data dispatched by the satellites. Typically, the augmentation data vary about every second, whereas the GPS data vary every hour.

BRIEF DESCRIPTION OF THE DRAWINGS

Other characteristics and advantages of the invention will become apparent on reading the detailed description which follows, given by way of nonlimiting example and with reference to the appended drawings in which.

From one figure to the other, the same elements are labeled by the same references.

DETAILED DESCRIPTION

Figure 1:
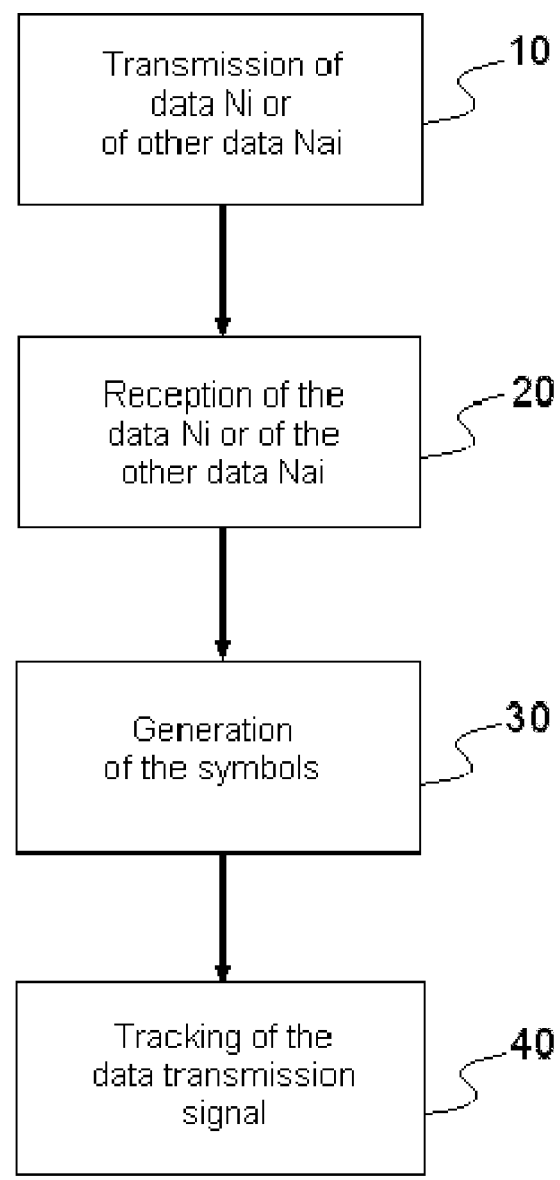
FIG. 1 schematically represents the steps of the method according to the invention, FIG. 2 schematically represents an exemplary way of transmitting data transmitted on a first and a second data pathway in the method according to the invention.

FIG. 1 schematically represents the steps of the method according to the invention corresponding to a method for improving a data transmission signal transmitted, in addition to the navigation signals dispatched by the visible satellites, to the receiver.

A data transmission signal can be in the form of an augmentation signal which transmits, for example, augmentation data, which are individual corrections on the navigation signals emitted to the receiver by the visible GNSS satellites.

The method according to the invention will be described in respect of an augmentation signal but it applies of course to any other data transmission signal which could be transmitted to the receiver of the satellite navigation system in addition to the navigation signals emitted by the satellites.

The method according to the invention comprises a step 10 of transmission, during successive improvement periods TAAi and by means of an improvement signal emitted in coherence with the augmentation signal, of data Ni, which are furthermore transmitted by means of the augmentation signal during successive transmission periods TAi starting respectively after the end of the respective successive improvement periods TAAi (that is to say of like index i).

Advantageously, "improvement signal emitted in coherence with the augmentation signal" is understood to mean that the signals are coherent at the level of the spreading codes, that is to say that the spreading codes are transmitted in a synchronous manner, using for example a QPSK modulation.

The augmentation signal is advantageously emitted by an augmentation satellite. The improvement signal is likewise emitted by the augmentation satellite. Stated otherwise, the improvement signal is emitted by the same emitter as the augmentation signal. This characteristic makes it possible to transform the first data pathway into a pilot pathway as we shall see subsequently.

Moreover, this characteristic makes it possible to transmit, as we shall see subsequently, the successive improvement data to the receiver during improvement periods finishing before the respective successive data transmission periods.

As a variant, instead of the data Ni it is possible to transmit to the receiver, by means of the improvement signal, during the successive improvement periods, other data Nai making it possible to predict the data Ni.

Given that the example described deals with the case where the data transmitted are augmentation data, the transmission periods TAi are called augmentation periods hereinafter in the text.

The improvement signal being, in the example described, an augmentation signal, the data Ni are augmentation data.

The method according to the invention can also comprise a step of transmitting the data or other data during a single period.

The augmentation signal is dispatched on a data pathway, or channel, VD1 and the improvement signal is dispatched on a second data pathway, or channel, VD2 (or improvement pathway).

Figure 2:
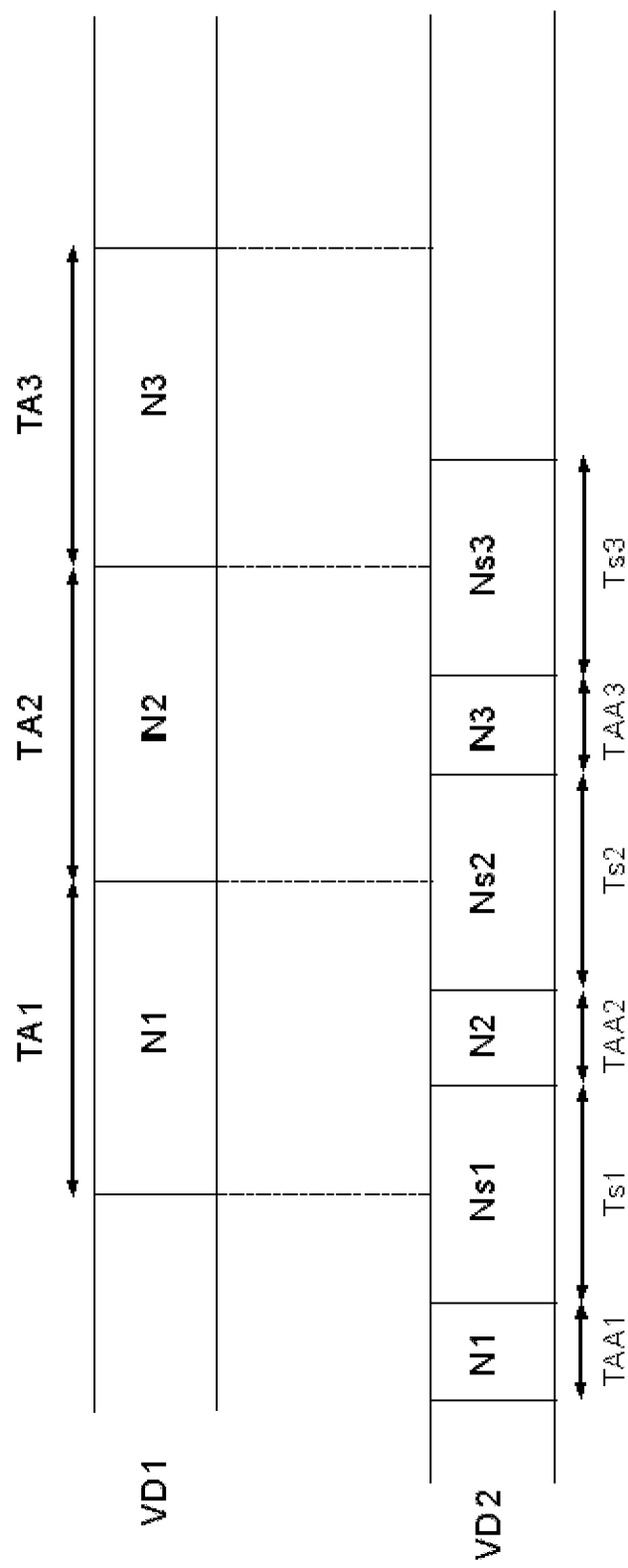

The transmission step is represented in FIG. 2 representing, over time, the data which are transmitted on the first data pathway VD1 and on the second data pathway VD2.

First N1, second N2 and third N3 augmentation data are transmitted on the first data pathway VD1 during a first TA1, a second TA and respectively a third TA3 consecutive augmentation period.

The first N1, second N2 and third N3 improvement data are transmitted on the second data pathway VD2 during a first TAA1, a second TAA2 and respectively a third TAA3 successive improvement period.

The first improvement period TAA1 starts and finishes before the start of the first augmentation period TA1. The second improvement period TA2 starts and finishes before the start of the second augmentation period TA2. The third improvement period TAA3 starts and finishes before the start of the third augmentation period TA3.

Conventionally, as seen previously, the augmentation signal, or more generally the data transmission signal such as is intended in the method according to the invention, is transmitted without data coding or with a coding using the former data transmission techniques such as Viterbi coding without interleaving in the case of an augmentation signal. The improvement signal is dispatched using the new data transmission techniques such as interleaving, turbocode, etc.

The two data pathways are modulated by symbols.

The bitrate in terms of symbols of the improvement signal is advantageously greater than the bitrate in terms of symbols of the data transmission signal, here the augmentation signal.

This makes it possible optionally to dispatch, to the receiver, additional data Nsi by means of the improvement signal which are different from the first data dispatched by means of the augmentation signal. This characteristic makes it possible to ensure additional services by means of the additional data. The quality of the existing services is thus improved while offering new services which are not necessarily dedicated to the aeronautical community.

In the representation of FIG. 2, the bitrate of the symbols of the improvement signal is such that the durations of the periods of transmission of the improvement data by means of the improvement signal are shorter than the durations of the periods of transmission of the augmentation data by means of the augmentation signal.

This is represented in FIG. 2. First Ns1, second Ns2 and third Ns3 additional data travel on the second data pathway, between the consecutive transmissions of augmentation data, during a first Ts1, a second Ts2 and a third Ts3 respective additional period. Stated otherwise, the improvement signal transmits the respective data Ni, or the respective other data Nai making it possible to predict the respective data, as well as respective additional data Nsi during the respective augmentation durations TAi.

In the representation of FIG. 2, the bitrate of the symbols of the improvement signal is such that the duration of the period of transmission of the improvement data Ni by means of the improvement signal and of the additional data Nsi is equal to the duration of the period of transmission of the augmentation data Ni by means of the augmentation signal.

The augmentation data Ni or the other data Nai allowing the receiver to predict the augmentation data Ni which are transmitted by means of the improvement signal are thereafter received 20 by the receiver.

The augmentation data Ni of index i which are dispatched by means of the improvement signal are completely received before the dispatching of the augmentation data of like index which are transmitted to the receiver by means of the augmentation signal. Stated otherwise, the receiver receives an item of data transmitted by means of the improvement signal before the dispatching of an item of data of like index, transmitted by means of the augmentation signal.

The advance with which the receiver receives the data Ni by means of the improvement signal is exploited so as to erase the modulations on the channel existing, that is to say on the first data pathway.

More precisely, the receiver generates the successive symbols 30 serving to modulate the augmentation signal during the respective successive augmentation periods TAi, by means of the data Ni or of the other data Nai respectively received. This is the data received by the receiver and which have been transmitted by means of the improvement signal.

The receiver performs processings identical to those carried out by the system to transform the augmentation data into symbols.

Once the symbols have been obtained, the receiver can track 40 the data transmission signal, which here is an augmentation signal, with good precision since by removing the effect of the modulation of the augmentation signal by the symbols that it has generated, it is possible to gain about 6 dB for the tracking of the phase of the signal, for example.

This tracking step 40 carried out by demodulating the augmentation signal by means of the generated symbols amounts to transforming the first data pathway VD1 into a pilot pathway on which no data is transmitted. The demodulation of the augmentation signal by means of the symbols generated is called "symbol wipe off" with reference to the terminology "data wipe off" when entailing demodulation by means of data.

It has been seen that, on the second data pathway VD2, either the data Ni which are transmitted on the first data pathway VD1, or other data Nai which make it possible to predict these data Ni, are transmitted with a slight advance. This second possibility affords a gain in terms of bitrate of the improvement signal since there is no necessity to transmit the data Ni in their entirety. When this second solution is used, an additional step of predicting the data Ni is carried out at the level of the receiver, prior to the step of generating the symbols 30.

Advantageously, in the case where the data transmitted by the improvement signal are coded by means of a second data coding, the second data coding is more efficacious than the first coding in such a way that the threshold of demodulation of the improvement signal, by the receiver, is lower than the threshold of demodulation of the augmentation signal.

The second coding is, for example, a coding of the Turbocode or LDPC type, with reference to the expression "Low Parity Density Code". Advantageously, the improvement signal is transmitted with interleaving.

On the second data pathway VD2, the modulation by the symbols is, for example, a CSK modulation with reference to the expression "Code Shift Keying".

By using, on the second pathway, an LDPC coding and a CSK modulation using symbols of 4 ms and, on the first pathway, a Viterbi coding and symbols of 4 ms, an improvement in performance in terms of data reception of the order of 5.2 dB is obtained.

The invention claimed is:

1. A method for improving tracking of a data transmission signal emitted to a receiver of a satellite navigation system in addition to navigation signals transmitted to the receiver by the satellites, comprising:
   transmission to the receiver, during an improvement period TAAi, and by means of an improvement signal emitted in coherence with the data transmission signal, of data Ni or of other data Nai making it possible to predict the data Ni, the data Ni being further transmitted to the receiver by means of the data transmission signal during a transmission period TAi starting after the improvement period TAAi ends,
   reception, by the receiver, of the data Ni, or of the other data Nai, which are transmitted by means of the improvement signal,
   generating symbols to modulate the data transmission signal during the transmission period TAi, by means of the data Ni received or of the other data Nai received by the receiver and which have been transmitted by means of the improvement signal, and tracking the data transmission signal while removing an effect of the modulation of the data transmission signal using the symbols generated.

2. The method as claimed in claim 1, in which the data transmission signal is an augmentation signal.

3. The method as claimed in claim 1, in which the data transmission signal is transmitted with a first data coding of a Viterbi type.

4. The method as claimed in claim 1, wherein the improvement signal is transmitted with a second coding such that a threshold of demodulation of the improvement signal by the receiver is lower than a threshold of demodulation of the data transmission signal by the receiver.

5. The method as claimed in claim 1, in which the improvement signal is transmitted with a second coding of a low-density parity-check (LDPC) or Turbocode type.

6. The method as claimed in claim 1, in which the improvement signal is transmitted with interleaving.

7. The method as claimed in claim 1, in which the duration of the improvement period is shorter than the duration of the data transmission period.

8. The method as claimed in claim 1, in which additional data are furthermore transmitted to the receiver by means of the improvement signal.

9. The method as claimed in claim 1, in which the improvement signal and the data transmission signal are emitted in coherence by the same emitter.

\* \* \* \* \*